United States Patent Office 3,432,256
Patented Mar. 11, 1969

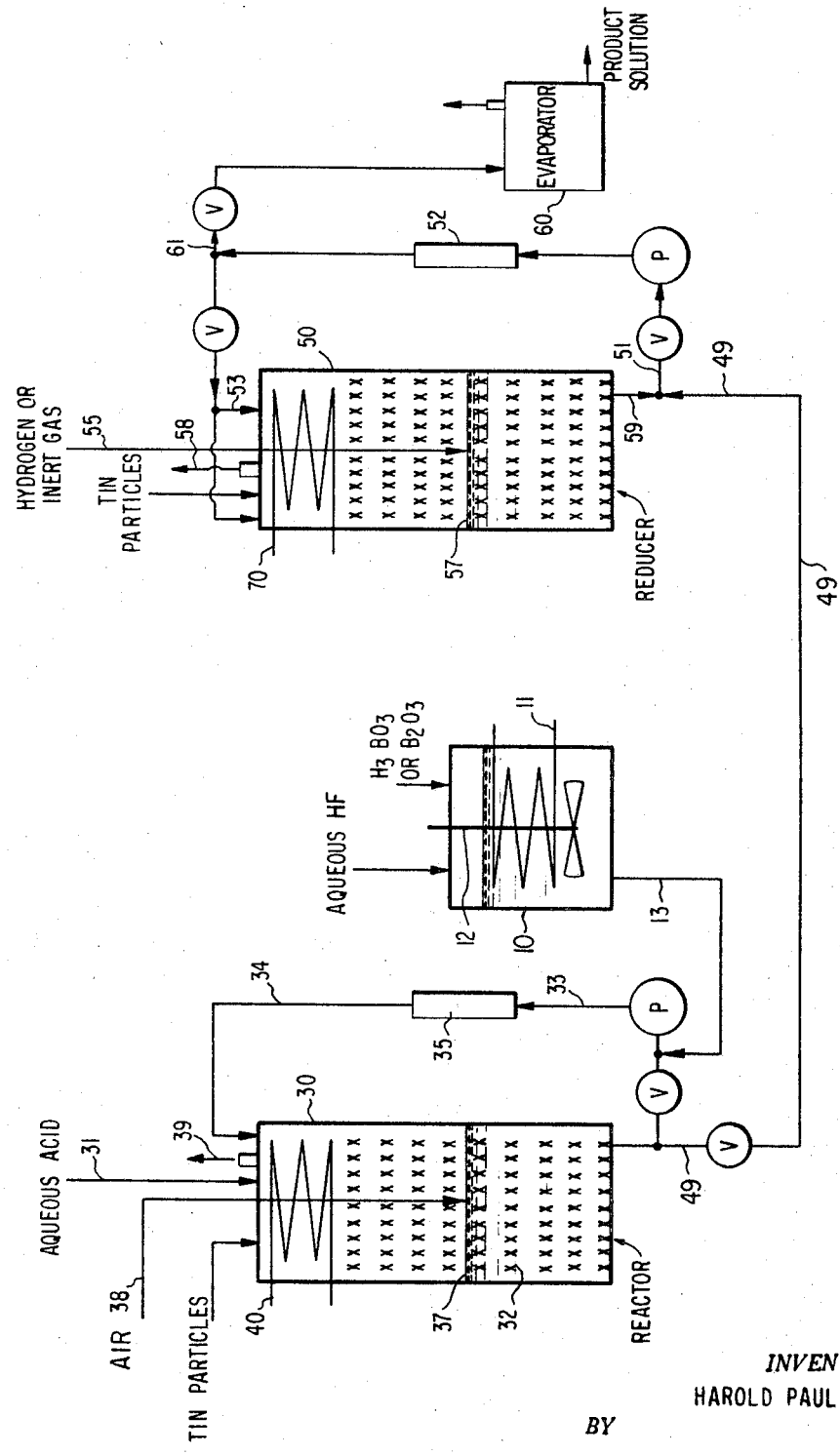

3,432,256
PRODUCTION OF STANNOUS FLUOBORATE
Harold Paul Wilson, Sewickley, Pa., assignor to Vulcan Materials Company, Clark, N.J., a corporation of New Jersey
Filed May 3, 1966, Ser. No. 547,286
U.S. Cl. 23—59      12 Claims
Int. Cl. C01g *19/04;* C01b *35/00*

ABSTRACT OF THE DISCLOSURE

Stannous fluoborate is made by contacting an aqueous tin fluoborate solution which includes stannic fluoborate at a temperature between about 60° C. and the boiling point of the solution in the substantial absence of oxygen with an excess of metallic tin which is in a form having a specific surface area of at least 0.4 cm.²/gram, whereby the tetravalent tin in the solution is reduced to divalent tin. The initial aqueous tin fluoborate solution may be made by first contacting aqueous fluoboric acid with an excess of metallic tin while passing an oxygen-containing fluid such as air through the aqueous acid.

This invention relates to an improved process for making stannous fluoborate from materials having a substantial content of stannic or tetravalent tin. More particularly, it relates to a process for converting stannic fluoborate to a pure or substantially pure form of stannous fluoborate in aqueous solution. Still more particularly, it relates to the formation of tin fluoborate solutions having a substantial content of tetravalent tin in solution and the subsequent reduction of the dissolved tetravalent tin to divalent tin by contact with metallic tin in a non-oxidizing environment.

A preferred embodiment of the invention involves making tin fluoborate by reacting metallic tin directly with aqueous fluoboric acid in the presence of free molecular oxygen gas and then contacting the resulting solution of stannous and stannic fluoborate with metallic tin in the absence of free oxygen, preferably in the presence of a non-oxidizing gas such as nitrogen, and still more preferably in the presence of a reducing gas such as hydrogen. In another embodiment the invention involves making stannic fluoborate by dissolving stannic hydrate in aqueous fluoboric acid or in equivalent amounts of aqueous HF and $H_3BO_3$, and then reducing the stannic fluoborate solution with metallic tin in the absence of free oxygen. Stannic hydrate suitable for this second embodiment can be obtained inexpensively in many known ways, for instance, by water extraction of sodium fluostannate, $Na_2SnF_6$, from "blue sludge" (which is a waste product from acid fluoride electrolyte solutions used for electrotinplating of steel strip), precipitation of stannic hydrate from the sodium fluostannate solution by slow addition of a base such as NaOH, KOH or $NH_4OH$, separation of the precipitate by filtration or decantation, and washing the precipitate with water to free it of sodium fluoride and other soluble salts.

Stannous fluoborate is in increasing demand because of its use in electrolytic baths for the high speed electrotinplating of steel strip. However, its manufacture has heretofore involved complicated methods such as the careful conversion of stannous chloride to stannous hydrate and eventually to stannous fluoborate under non-oxidative conditions or that described in Patent No. 2,457,798. Direct reaction of fluoboric acid with metallic tin has heretofore not been found practical because of its very slow rate due to the polarizing effects of the hydrogen produced in the reaction. In addition, such prior attempts to react the acid and the metal directly have required rather elaborate equipment or special precautions to minimize the explosion hazard which arises from the generation of hydrogen which is incidental to this kind of reaction. Use of stannic compounds as starting materials has been heretofore thought impractical because of the well known fact that stannic fluoride is extremely difficult to reduce to stannous fluoride.

It is an object of this invention to provide a more efficient and more economical process for the manufacture of stannous fluoborate than processes available heretofore. A more specific object is to provide an efficient process for converting stannic fluoborate to stannous fluoborate. Another specific object is to accelerate the normally slow reaction of aqueous fluoboric acid with tin metal without requiring the addition of any other metal compound and to produce an aqueous solution of stannous fluoborate containing no or substantially no stannic salt. Stannic fluoborate is undesirable in tinplating solutions because it reduces the electrochemical efficiency of the electroplating step.

The attainment of these and other objects by this invention, as well as the nature, scope and operation of this invention, will become more clearly apparent from the following detailed description, the attached drawing and the appended claims.

The attached drawing diagrammatically illustrates a preferred embodiment of a system suitable for carrying out the invention.

It has now been discovered that high purity stannous fluoborate, hereafter referred to as stannous fluoborate, can be efficiently and economically produced by circulating or percolating aqueous fluoboric acid through a mass of tin particles such as the "mossy" form of reagent grade tin which provides sufficient free space for contact with or percolation of this solution. An oxygen gas such as oxygen or air or any other mixture of oxygen and an inert gas, or oxygen from some other convenient source such as ozone or hydrogen peroxide, is passed through the mixture in an amount sufficient to react with the hydrogen liberated in the process, thereby forming water while depolarizing the metal. The several reactions taking place in this step can be represented by the following equations:

(a) $Sn + 2HBF_4 \rightarrow Sn(BF_4)_2 + H_2$
(b) $2Sn + 4HBF_4 + O_2 \rightarrow 2Sn(BF_4)_2 + 2H_2O$
(c) $Sn + 4HBF_4 \rightarrow Sn(BF_4)_4 + 2H_2$
(d) $Sn + 4HBF_4 + O_2 \rightarrow Sn(BF_4)_4 + 2H_2O$
(e) $Sn(BF_4)_4 + Sn \rightarrow 2Sn(BF_4)_2$ Reactions (a) and (b) are believed to be dominant, with the others secondary. However, reactions (b), (d) and (e) in a sense constitute the essential features of this invention in that reactions (b) and (d) prevent the accumulation of hydrogen in the system while reaction (e) causes the stannic fluoborate which is formed in the solution to be reduced to stannous fluoborate.

More surprisingly, it has been discovered that, unlike the fluoride salt of tetravalent tin, its fluoborate salt can be reduced to the divalent salt quite readily by contact with metallic tin when free oxygen is excluded from the reaction zone. Accordingly, it has been found possible to reduce or eliminate the relatively high stannic tin content of the fluoroborate solution produced in the principal or oxidizing stage described above by passing it through a secondary or reducing stage where it is contacted with additional tin metal in the absence of free oxygen, i.e., in an inert or reducing gas atmosphere. In this manner the stannic fluoborate in the solution can be completely or substantially completely converted to stannous fluoborate. Preferably a reducing gas such as hydrogen is passed through the tin fluoborate solution while it is in contact with the tin metal in the reducing stage. Instead of hydrogen, an inert material which is gaseous at the temperature maintained in the reducing stage, such as nitrogen, argon, mixed inert gases from liquid oxygen plants, steam, fluorocarbons such as $CF_4$, carbon dioxide or the like can likewise be used. When a purge gas which is liquid at room temperature such as steam is used, it is advisable to provide a safety valve on the reducing reactor to protect it against collapse by the external atmosphere in the event of condensation of such a purge gas.

After treatment in the reducing stage the solution is ready for use. Alternatively, it can be concentrated prior to use by evaporation, until a syrupy aqueous solution containing between about 50% and 70% $Sn(BF_4)_2$ is obtained. Crystal separation, washing, and drying are unnecessary in this process while a product containing less than 5%, and if desired less than 1%, by weight of tetravalent tin is obtained.

EXAMPLE I

A specific embodiment of the invention will now be described in detail with reference to the accompanying drawing. Referring to this drawing, when fluoboric acid is available as an aqueous solution, e.g., as a solution containing 48 to 52% $HBF_4$, it can be pumped into reactor 30 through line 31, preferably after dilution with sufficient water to lower the acid concentration to about 30% to 40% $HBF_4$. In this concentration range, the solution has viscosity and density characteristics which are particularly favorable for the proper flow of the solution through the mass of tin particles and for the diffusion of oxygen gas therethrough. However, it is broadly possible to use $HBF_4$ acid concentrations above or below this range in this reaction stage. For instance, fluoboric acid solutions containing between about 30 and 70 weight percent $HBF_4$ can be used. Reactor 30, e.g., a steel tank lined with polytetrafluoroethylene, is packed to approximately one-half to three-quarters of its height with a bed or mass of mossy tin or similar tin forms 32 which have a high ratio of surface area to weight and allow sufficient free space for efficient circulation of the solution therethrough. The fluoboric acid solution fills about half the net reactor space containing the tin metal bed, leaving a substantial portion, e.g., about one-half, of the metal bed exposed above liquid level 37.

When fluoboric acid is not available as such, it can be made in tank 10 by carefully adding boric acid or boric anhydride to concentrated aqueous hydrofluoric acid, e.g., 52% or 70% HF, in the ratio of four mols of $H_3BO_3$. Sufficient water of dilution is also added in this case to produce the desired strength of $HBF_4$ and to facilitate solution of the solid boric acid. A cooling coil 11 is provided to cool the solution and maintain it at between about 60° and 100° C. Both the fluoboric acid reaction and the dilution are highly exothermic, and high temperatures tend to cause undesirable loss of acid vapor. A stirrer 12 is desirably provided to promote mixing. The hot acid solution is then pumped via lines 13, 33 and 34 to be sprayed, preferably in an even distribution on top of the bed of tin particles 32 in reactor 30. The acid solution may be further heated or cooled in heat exchanger 35 so as to maintain the desired reaction temperature in reactor 30.

Commercially available grades of metallic tin, e.g., Grade A tin, may be employed. Tin particles having a specific surface area of at least about 0.1 cm.² per g., preferably between about 0.5 and 15 cm.² per g. are particularly desirable. "Mossy" tin metal is a satisfactory commercial form but metallic tin in other configurations providing adequate free space for circulation of liquid therebetween is similarly usable. For instance, a suitable tin packing can be fabricated by cutting tin sheet, e.g., a sheet 2 mm. thick, into small strips of approximately 1 cm. x 4 cm. and bending such strips to form them into rings.

The reactions in reactor 30 can be carried nearly to completion with only a low concentration of free fluoboric acid by circulating the solution through and around the reactor at any temperature ranging up to the boiling point of the acid solution, preferably at a temperature between about 60° and 100° C., e.g., at 80° C. In reactor 30 the solution percolates or trickles down through the mass of tin particles 32 until it reaches liquid level 37 which is maintained in an intermediate portion of the reactor. An oxidizing gas such as air is introduced into reactor 30 via line 38 which preferably releases the gas above the liquid level 37. A plurality of such lines may be used to enhance the even distribution of the oxidizing gas across the vessel. Alternatively, the gas may be bubbled up into the vessel from the bottom, but this is less desirable because this tends to offset the reduction of stannic tin which the tin particles submerged in the solution cause in the bottom portion of the reactor.

The oxidizing gas is introduced into the reactor at a rate sufficient to promote the reaction, e.g., at a rate of between about 0.5 to 2 mols, preferably to about 1.05 to 1.3 mol of oxygen, per two mols of tin metal dissolved. However, since the effect of oxygen is partly catalytic, even a very small amount of oxygen introduced into the reactor is beneficial. It should be understood that the reaction rate depends at least in part on the rate of diffusion of oxygen through a thin film of solution flowing over the tin metal surfaces. Accordingly, the optimum flow rate in each case is determined by the specific combination of reaction conditions employed, e.g., solution flow rate, active metal surface, solution temperature, viscosity and density of the solution, and the concentration of reactants and products therein. The optimum oxygen flow rate can be routinely determined for any given set of conditions by empirical tests. Obviously, excessive rates of oxygen flow are undesirable because they favor the production of stannic instead of stannous fluoborate.

The gas in reactor 30 flows countercurrent to the downwardly percolating acid solution, contacting the solution at the tin metal surface and finally being removed via vent 39. Acid vapors present in the vapor space above the tin particles are desirably refluxed by condenser 40. Of course the refluxing condenser can be external to reactor 30 in a separate vessel connected to the vapor space of the reactor. Air heated to a temperature between about 60° and 80° C. is a particularly desirable form of oxidizing gas for use in the present process. However, any other source of oxygen that does not contaminate the product solution can also be used.

After adequate circulation through the reactor, e.g., after a total contact time with metallic tin of between about 10 to 24 hours, the tin fluoborate bearing solution is withdrawn from reactor 30 via line 49. At this stage the solution may contain about 30 to 70 weight percent, e.g. 50 percent stannous fluoborate, about 2 to 10 weight percent, e.g., 50 percent tetravalent tin, and about 0.2 to 5 weight percent, preferably not more than 2 percent, of free fluoboric acid. If the amount of stannic fluoborate present is not objectionable, this solution is suitable for direct use after being concentrated by vacuum evaporation. However, where a product substantially free of stannic acid salts is required, the solution is treated further in a separate reducing zone such as reactor 50. This reducing reactor 50 can be of similar design as the oxidizing reactor 30. Its main purpose is to reduce the stannic salt which is formed in primary reactor 30 as an undesirable product contaminant conjointly with the desired stannous fluoborate. Any remaining free acid may also be reacted in reactor 50 to produce additional stannous fluoborate.

Reactor vessel 50 is filled with tin particles in a manner similar to that of reactor 30 and the liquid level is again preferably maintained in an intermediate portion of the vessel, e.g., about half way down the mass of tin particles. It is possible to operate with the tin particles completely submerged in the circulating solution, with the inert gas in the vapor space thereabove serving only to exclude oxygen. However, the operation is more efficient when the solution from the oxidizing reactor is introduced to the top of reducing reactor 50 via line 51 and overhead line 53 and caused to percolate down over the exposed tin surface in a nonoxidizing atmosphere. In the preferred embodiment a reducing gas such as hydrogen is introduced into vessel 50 via line 55 and may be vented via vent 58. Especially if a substantial amount of free acid is present in the liquid feed to this vessel, it is preferred to introduce the gas near the liquid level 57 so as to flow countercurrent to the percolating liquid to afford maximum contact of gas and liquid at tin metal surfaces, thereby accelerating reduction. A hydrogen feed rate to reactor 50 equal to one mol of hydrogen per mol of stannic fluoborate present in the entering solution is satisfactory and lower or higher gas feed rates can be used.

The liquid in vessel 50 is suitably maintained at a similar temperature as in oxidizing reactor 30, e.g., between 60° and the boiling point of the solution. A satisfactory temperature is 80° C. The desired temperature may be maintained by passing the circulating tin fluoborate solution through heat exchanger 52. The acid vapors in the vapor space above the tin particles are refluxed by a condenser 70. The solution may be pumped around reactor 50 via lines 59, 51, and 53 until essentially all free fluoboric acid is reacted with tin and essentially all of the stannic fluoborate present is reduced to stannous fluoborate, e.g., until a solution containing not more than one weight percent, preferably less than 0.5 percent, stannic tin is obtained. A contact time of between about 10 and 48 hours is generally satisfactory. Times near the lower end of this range are sufficient when hydrogen gas is circulated through the system, whereas longer times are preferred when an inert gas such as nitrogen is used. The resulting product solution may then be pumped via line 61 to an evaporator 60 and there concentrated, e.g., at a 23.5 in. Hg or at any other suitable higher or lower pressure, until a syrupy aqueous solution containing between about 50 and 70% stannous fluoborate is produced.

Because of the corrosive nature of the solutions used in this process the equipment in contact with the solutions is constructed of a material which is resistant to hydrofluoric acid and fluoboric acid. For instance, polyethylene, high impact polyvinyl chloride, polypropylene, fluoroethylene polymers, chlorinated polyethers or the like, or steel vessels lined with such polymers, are suitable. Where the process temperature is above 60° C., the use of polymers of tetrafluoroethylene or chlorotrifluoroethylene is particularly preferred.

It should be understood that instead of operating an essentially continuous process with a separate oxidizer reactor and reducing reactor as described above it is also possible to conduct a batch operation by carrying out the oxidizing and reducing phases in sequence in a single reactor. Thus, referring to the drawing, it is possible to operate the reactor 30 as an oxidizer by circulating the solution through and around it until the desired concentration of tin is dissolved in the acid solution. Thereupon the feed of oxidizing gas is cut off and replaced with an inert gas or a reducing gas such as hydrogen and circulation of the solution is continued until the concentration of stannic tin in the solution is reduced to the desired level. It should also be understood that instead of operating with the mass of solid tin particles in the form of an essentially fixed bed, it is possible to operate by first sparging an oxidizing gas such as air through an agitated mixture containing tin powder suspended in a hot fluoboric acid solution, then stopping the flow of air, and maintaining agitation of the suspension while maintaining it blanketed with hydrogen or an inert gas such as nitrogen.

EXAMPLE II 400 parts by volume of a clarified aqueous solution of $Na_2SnF_6$, containing 13.14 g.p.l. of the salt, was heated to 60° C. and aqueous NaOH was added slowly until a pH of 9 was reached, thereby precipitating stannic hydrate. For good filtration and hydrate settling characteristics, the pH of the mixture or sludge was then adjusted to 7 by addition of a mineral acid such as dilute sulfuric acid. The stannic hydrate was filtered out and washed with 500 parts by volume distilled water. The washed hydrate was repulped with distilled water to a volume of about 150 parts. To this slurry was added 68 parts by volume of 26% HF followed by an aqueous solution containing 27.3 g.p.l. $H_3BO_3$. The boric acid was added in the stoichiometric amount required to give $HBF_4$ with the HF present. About 150% excess $HBF_4$ was added to the tin hydrate slurry. Almost all the milky white precipitate that had formed dissolved upon heating to 60° C., leaving only a slight haze in the solution. The haze is assumed to be stannic oxyfluoride. The solution was evaporated to 100 parts by volume and then placed in a polytetrafluoroethylene vessel filled with mossy tin, whereby the haze promptly disappeared and the solution became water clear. A polypropylene cover was placed on the vessel to limit evaporation and the collection containing the mixture of mossy tin and the solution of stannic fluoborate and excess fluoboric acid was gently boiled for 38 hours. No special precautions were taken to exclude air from the vessel. At the end of this period the solution analyzed 177.99 g.p.l. total Sn, 177.30 g.p.l. $Sn^{+2}$ (99.61% reduced Sn), and 0.69 g.p.l. $Sn^{+4}$. The same or a greater degree of reduction can be obtained in a much shorter time by circulating the above described stannic fluoborate solution over mossy tin in the presence of hydrogen gas in a reducing reactor such as previously described reactor 50.

Having thus described this invention, its scope is particularly pointed out and claimed in the appended claims.

What is claimed is:

1. A process for the production of stannous fluoborate which comprises contacting an aqueous fluoborate solution containing tetravalent tin at a temperature between about 60° and 100° C. in the substantial absence of molecular oxygen with an excess of metallic tin in a form having a specific surface area of at least about 0.1 cm.²/gram until at least 99% of the dissolved tin is present in the divalent state, and recovering the resulting stannous fluoborate solution.

2. A process according to claim 1 wherein said contacting is conducted in the presence of a non-oxidizing gas.

3. A process according to claim 1 wherein said contacting is conducted in the presence of gaseous hydrogen.

4. A process for the production of stannous fluoborate which comprises contacting an aqueous solution of fluoboric acid containing between about 30 and 70 weight percent $HBF_4$ with a stoichiometric excess of metallic tin in a form having a specific surface area of at least about 0.5 cm.²/gram in an acid contacting zone at between about room temperature and the boiling point of said solution, passing a molecular oxygen supplying fluid through said solution in the presence of said metallic tin at a rate sufficient to promote the reaction, said rate being within the range of between about 0.5 and about 2 moles of molecular oxygen per 2 moles of tin dissolved, thereby forming a fluoborate solution containing more than 1 weight percent of tetravalent tin, contacting said fluoborate solution with metallic tin in a form having a specific surface area of at least about 0.5 cm.²/gram in the presence of a non-oxidizing gas at a temperature between about 60° C. and the boiling point of the solution in a reducing zone until less than 1 weight percent of the dissolved tin is in the tetravalent state, and recovering the resulting stannous fluoborate solution.

5. A process according to claim 4 wherein said fluoboric acid solution contains from 30 to 40 weight percent $HBF_4$ and wherein the metallic tin in said acid contacting zone is in a form having a specific surface area between about 0.5 and about 15 cm.²/gram.

6. A process according to claim 4 wherein said fluoboric acid solution is circulated in said acid contacting zone through a bed of metallic tin particles at a temperature between about 60° and 100° C.

7. A process according to claim 6 wherein said acid contacting zone containing the bed of tin particles is partially filled with said fluoboric acid solution to form a liquid level at an intermediate height of said bed and leave a substantial portion of said bed emerging above said level, trickling fluoboric acid solution downwardly through said emerging portion of said bed, releasing a molecular oxygen containing gas into said zone at an intermediate level thereof, passing said gas countercurrently to said trickling solution, withdrawing spent gas from an upper portion of said zone, and removing stannous fluoborate solution from said zone at a point below said liquid level.

8. A process according to claim 6 wherein the stannous fluoborate solution introduced into said reducing zone contains about 30 to 70 weight percent stannous fluoborate, about 2 to 10 weight percent stannic fluorate and about 0.2 to 5 weight percent free fluoboric acid.

9. A process according to claim 6 wherein said solution in said reducing zone is maintained at a temperature between about 60° and 80° C. and wherein a non-oxidizing gas is introduced into said reducing zone.

10. A process according to claim 9 wherein said gas in the reducing zone is hydrogen.

11. A process according to claim 9 wherein said gas in the reducing zone is nitrogen.

12. A process according to claim 9 wherein the stannous fluoborate solution withdrawn from said reducing zone is evaporated at a reduced pressure and in the substantial absence of free oxygen until a syrupy aqueous solution containing more than 50% stannous fluoborate is produced.

References Cited

UNITED STATES PATENTS 2,457,798  1/1949  Ferguson _____ 23—59

FOREIGN PATENTS 814,638  6/1959  Great Britain.

OSCAR R. VERTIZ, *Primary Examiner.*

H. T. CARTER, *Assistant Examiner.*